(12) United States Patent
Oda

(10) Patent No.: US 7,411,710 B2
(45) Date of Patent: Aug. 12, 2008

(54) OPTICAL BEAM SCANNING DEVICE AND IMAGE FORMING APPARATUS

(75) Inventor: Ayumu Oda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 201 days.

(21) Appl. No.: 11/234,537

(22) Filed: Sep. 22, 2005

(65) Prior Publication Data
US 2006/0061848 A1 Mar. 23, 2006

(30) Foreign Application Priority Data
Sep. 22, 2004 (JP) .......................... P2004-275827

(51) Int. Cl.
*G02B 26/08* (2006.01)
*B41J 15/14* (2006.01)
(52) U.S. Cl. .................. 359/198; 359/212; 347/242
(58) Field of Classification Search ................ 359/212, 359/198; 347/242
See application file for complete search history.

(56) References Cited

U.S. PATENT DOCUMENTS

| 5,633,744 | A * | 5/1997 | Nakajima | 359/196 |
| 6,567,201 | B1 * | 5/2003 | Tsuchida | 359/204 |
| 6,805,504 | B1 * | 10/2004 | Nisnevich | 400/283 |
| 6,995,885 | B2 * | 2/2006 | Nakajima | 359/198 |
| 2003/0137709 | A1 * | 7/2003 | Matsui et al. | 359/198 |
| 2004/0246553 | A1 * | 12/2004 | Yoshizawa | 359/216 |
| 2005/0185237 | A1 * | 8/2005 | Nakajima | 359/212 |
| 2005/0190420 | A1 * | 9/2005 | Imai et al. | 359/210 |
| 2006/0139715 | A1 * | 6/2006 | Tamaru et al. | 359/204 |
| 2007/0053043 | A1 * | 3/2007 | Wda et al. | 359/216 |

FOREIGN PATENT DOCUMENTS

| JP | 05-005846 | 1/1993 |
| JP | 2001-235699 | 8/2001 |
| JP | 2001-281587 | 10/2001 |

* cited by examiner

*Primary Examiner*—Arnel C. Lavarias
*Assistant Examiner*—Jade Callaway
(74) *Attorney, Agent, or Firm*—David G. Conlin; David A. Tucker; Edwards Angell Palmer & Dodge LLP

(57) ABSTRACT

An optical beam scanning device is configured from a deflecting unit that has a function to support a deflecting member and a light source, including an exposing semiconductor laser, a polygon mirror, a first fθ lens and a second fθ lens, and strictly regulate their position relative to each other; and a support member that has a function to support a mirror, a second cylindrical lens and a AD sensor along with the deflecting unit, and appropriately position them relative to a photoreceptor drum; and a housing that has a function to cover the outer portion of the deflecting unit and the support member, along with strengthening the support member.

22 Claims, 8 Drawing Sheets

OPTICAL BEAM SCANNING DEVICE AND IMAGE FORMING APPARATUS

CROSS REFERENCE

This Non provisional application claims priority under 35 U.S. § 119(a) on Patent Application No. 2004-275827 filed in Japan on Sep. 22, 2004, the entire contents of which are hereby incorporated by reference.

BACKGROUND OF THE INVENTION

The present invention relates to an optical beam scanning device that irradiates image light modulated by a signal based on image data to the surface of an image bearing member, used in an image forming apparatus such as a printer, facsimile, copy machine, or the like that performs electrophotographic image formation, and an image forming apparatus provided with this optical beam scanning device.

As an optical beam scanning device of an image forming apparatus, laser beam systems are widely used that make laser light, which has a fast modulation speed and can increase scanning speed, into image light.

In recent years, conversion of image forming apparatuses to color has been advancing, and various optical beam apparatuses for color image formation have been developed. Conventional optical beam scanning devices for color image formation have been provided one for each component color, and an optical beam scanning device must be disposed in the image forming apparatus for each color, and along with increased size of the image forming apparatus, expensive optical parts are redundantly provided, leading to increased cost.

Accordingly, as disclosed in JSP 2001-235699A and JSP 2001-281587A, technology has been proposed wherein multiple laser light sources for each component color are provided in a single optical beam scanning device. In this optical beam scanning device, mirrors for each component color are housed along with laser light sources for each component color, a single polygon mirror, and a single fθ lens in a single housing, and after the light beam emitted from each laser light source is deflected at a constant angular velocity by the single polygon mirror and deflected at a constant velocity by the single fθ lens, it is separated and dispersed toward the image bearing member for each component color via the mirror provided for each component color.

However, in the optical beam scanning devices disclosed in JSP 2001-235699A and JP 2001-281587A, the mirrors for each component color, the laser light sources, the polygon mirror, and the fθ lens are housed in a single housing, therefore leading to the problem of increased size of the apparatus.

In order to prevent the deterioration of color image quality due to the occurrence of color shift, it is necessary to strictly maintain the relative position of optical parts such as the laser light sources, polygon mirror, fθ lens, and mirrors, and their position relative to the image bearing members, and the influence of environmental conditions on the optical beam scanning device, particularly changes in temperature, must be made small.

Thus, using expensive and heavy resin material with a small coefficient of linear expansion such as BMC (Bulk Molding Compound) for the material of the housing, which is a large member that supports all of the optical parts, leads to a jump in the cost of parts and increased weight.

This sort of problem occurs not only in an optical beam scanning device used in a color image forming apparatus that forms a color image, but also in an optical beam scanning device used in an image forming apparatus that forms a monochrome image.

It is an object of this invention to provide an optical beam scanning device that can realize lower cost and weight by reducing the amount of expensive and heavy materials used as much as possible, and to provide an image forming apparatus provided with that optical beam scanning device.

SUMMARY OF THE INVENTION

As a member that supports a light source that constitutes optical parts for allowing an optical beam to scan a scanning target, a deflecting member, and a reflecting member, this invention is provided with a deflecting unit that has a function for holding the light source and the deflecting member, and a support member that has a function for supporting the deflecting unit and the reflecting member. The light source and the deflecting member are integrally held in the deflecting unit while maintaining their position relative to each other, and in the support member, the deflecting unit and the reflecting member are supported while preserving the position of the light source and the deflecting member relative to the reflecting member.

DESCRIPTION OF THE INVENTION

Figure 1:
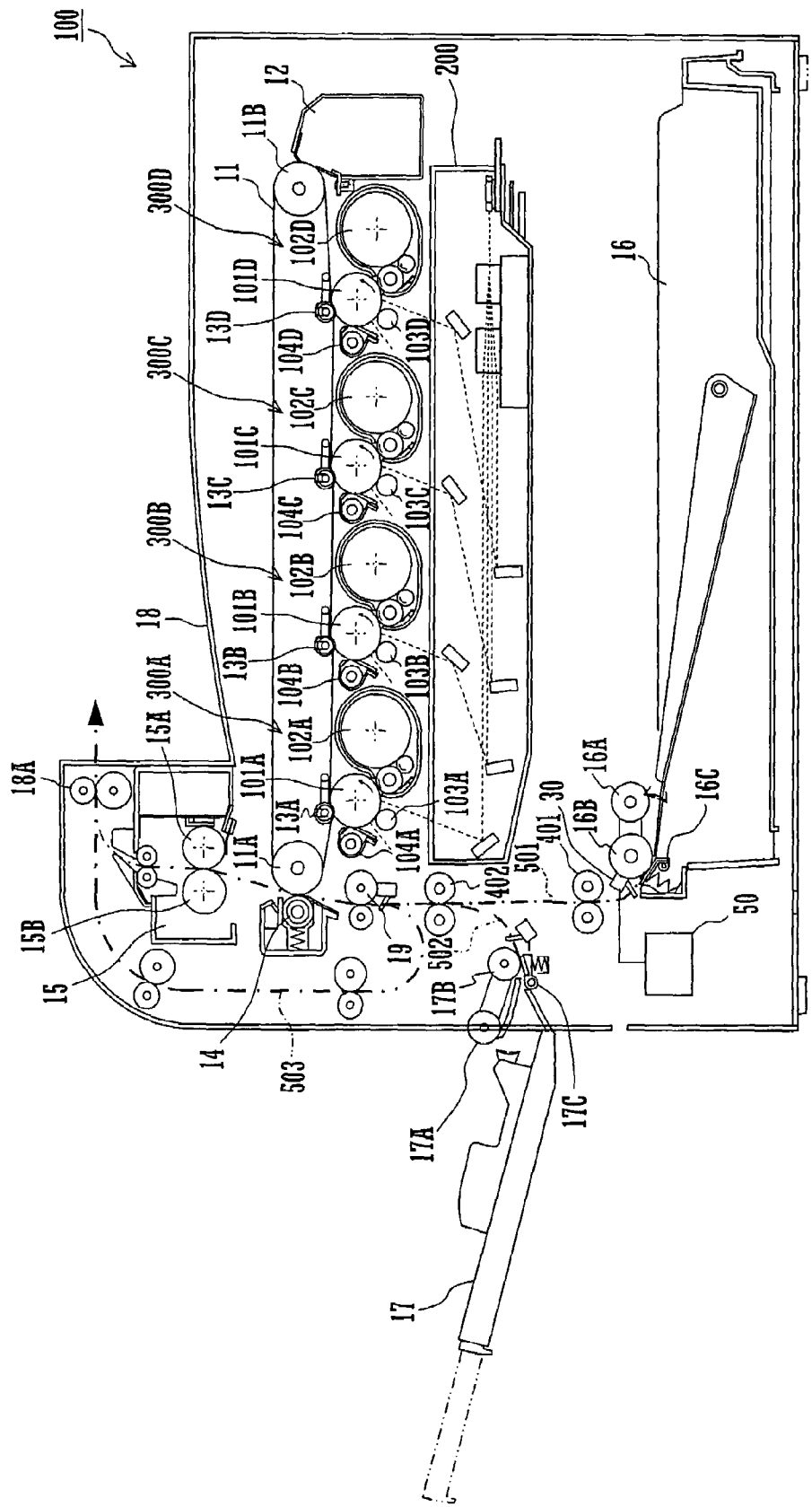
FIG. 1 is an explanatory diagram that shows a simple configuration of the image forming apparatus 100 provided with an optical beam scanning device according to an embodiment of this invention.

FIG. 1 is an explanatory diagram that shows a simple configuration of an image forming apparatus 100 provided with an optical beam scanning device according to an embodiment of this invention. The image forming apparatus 100, which is the main apparatus, forms a multi-color or monochrome image on paper based on image data sent via a network or the like. Thus, the image forming apparatus 100 includes an exposing unit 200, photoreceptor drums 101A to 101D, developing apparatuses 102A to 102D, charging rollers 103A to 103D, cleaning units 104A to 104D, an intermediate transfer belt 11, first transfer rollers 13A to 13D, a second transfer roller 14, a fixing apparatus 15, paper transport paths 501 through 503, a paper supply cassette 16, a manual paper supply tray 17, and a receiving tray 18.

The image forming apparatus 100 performs image formation in image forming portions 300A through 300D using image data corresponding to the hues of the four colors cyan, magenta, and yellow, which are the three subtractive primary colors obtained by color separation of a color image, and black. The image forming portions 300A through 300D are given a configuration similar to each other. For example, the black image forming portion 300A is provided with the photoreceptor drum 101A, the developing apparatus 102A, the charging roller 103A, the transfer roller 13A, and the cleaning unit 104A. The image forming portions 300A through 300D are arranged in a line in the direction of movement of the intermediate transfer belt 11 (the sub scanning direction perpendicular to the main scanning direction which is the scanning direction of the present invention).

However, although not shown in FIG. 1, the photoreceptor drum 101A is made to have a large diameter in comparison to the photoreceptor drums 101B through 101D. With monochrome image formation performed using only the black image forming portion 300A, there are high requirements for faster speed, and frequency of use is higher than for color image formation performed using all of the image forming portions 300A through 300D. Thus, the reason for the larger diameter is that it is necessary to make the lifetime of the photoreceptor drum 101A provided in the black image forming portion 300A longer than that of the photoreceptor drums 101B through 101D. The photoreceptor drums 101B through 101D are made to have the same diameter. Thus, the space between the rotation axle of the photoreceptor drum 101A and the rotation axle of the photoreceptor drum 101B is longer than the space between the rotation axles of the respective photoreceptor drums 101B through 101D.

The charging rollers 103A to 103D are contact chargers that charge the surfaces of the photoreceptor drums 101A to 101D, which are image bearing members, as the scanning targets of this invention, to a uniform potential. Contact chargers using a charging brush or non-contact chargers using a charging charger may be used in place of the charging rollers 103A to 103D.

The exposing unit 200, which is the optical beam scanning device of this invention, irradiates laser beams (the optical beam of this invention) respectively modulated according to image data of the respective hues black, cyan, magenta and yellow to the respective photoreceptor drums 101A to 101D. Electrostatic latent images according to the image data of the hues black, cyan, magenta, and yellow are formed on the respective photoreceptor drums 101A to 101D. The exposing unit 200 is explained in detail below.

The developing apparatuses 102A to 102D supply toner to the respective surfaces of the photoreceptor drums 101A to 101D on which the electrostatic latent images are formed, and develops the electrostatic latent images into developer images. The respective developer apparatuses 102A to 102D store toner of the respective hues black, cyan, magenta, and yellow, and develop the electrostatic latent image of the respective hues formed on the respective photoreceptor drums 101A to 101D into a developer image of the respective hues black, cyan, magenta, and yellow. The cleaning units 104A to 104D remove/collect toner remaining on the surfaces of the photoreceptor drums 101A to 101D after developing/image transfer.

The intermediate transfer belt 11 is stretched between a driving roller 11A and a driven roller 11B, forming a loop-shaped movement path. The circumferential surface of the intermediate transfer belt 11 faces the photoreceptor drum 101D, the photoreceptor drum 101C, the photoreceptor drum 101B, and the photoreceptor drum 101A, in this order. The first transfer rollers 13A to 13D are arranged in respective positions sandwiching the intermediate transfer belt 11 and facing the photoreceptor drums 101A to 101D. The respective positions where the intermediate transfer belt 11 faces the photoreceptor drums 101A through 101D are first transfer positions.

In order to transfer the developer images carried on the surface of the photoreceptor drums 101A to 101D onto the intermediate transfer belt 11, a first transfer bias with polarity opposite to the charging polarity of the toner is applied to the first transfer rollers 13A to 13D by a constant voltage control. Thus, the developer image of each hue formed on the photoreceptor drums 101A to 101D is sequentially layered and transferred onto the outer peripheral surface of the intermediate transfer belt 11, and a full color developer image is formed on the circumferential surface of the intermediate transfer belt 11.

However, when image data for only some of the hues yellow, magenta, cyan, and black has been input, formation of the electrostatic latent images and developer images is performed only on some of the photoreceptor drums among the four photoreceptor drums 101A to 101D corresponding to the hue of the input image data. For example, when forming a monochrome image, formation of an electrostatic latent image and developer image is performed only on the photoreceptor drum 101A corresponding to the black hue, and only a black developer image is transferred to the circumferential surface of the intermediate transfer belt 11.

Each of the first transfer rollers 13A to 13D is configured with an axle of metal material (for example, stainless steel) with a diameter of 8 to 10 mm whose surface is covered in electrically conductive elastic material (such as EPDM: or urethane foam, for example), and with this electrically conductive elastic material a uniform high voltage is applied to the intermediate transfer belt 11.

The developer image transferred to the circumferential surface of the intermediate transfer belt 11 at each first transfer position is transported to a second transfer position (corresponding to the transfer position of the present invention), which is a position facing the second transfer roller 14, by rotation of the intermediate transfer belt 11. When performing image formation, the second transfer roller 14 is pressed against the circumferential surface of the intermediate transfer belt 11, whose internal circumferential surface makes contact with the circumferential surface of the driving roller 11A, with a predetermined nip pressure.

When the paper (the recording medium of this invention) supplied from the paper supply cassette 16 or the manual supply tray 17 passes between the second transfer roller 14 and the intermediate transfer belt 11, high voltage with a polarity opposite to the toner charging polarity is applied to the secondary transfer roller 14. Thus, the developer image is transferred from the circumferential surface of the intermediate transfer belt 11 to the surface of the paper.

Among the toner affixed to the intermediate transfer belt 11 from the photoreceptor drums 101A to 101D, toner that remains on the intermediate transfer belt 11 without being transferred onto the paper is recovered by a cleaning unit 12, in order to prevent color mixture in the following process.

The paper onto which a developer image has been transferred is guided to the fixing apparatus 15, and receives heat and pressure by passing between a heat roller 15A and a pressure roller 15B. Thus, the developer image is strongly fixed to the surface of the paper. The paper to which the developer image has been fixed is discharged onto the discharge tray 18 by a discharge roller 18A.

In the image forming apparatus 100, a paper transport path 501 is provided in an approximately perpendicular direction for feeding paper housed in the paper supply cassette 16, between the second transfer roller 14 and the intermediate transfer belt 11 and then via the fixing apparatus 15, to the discharge tray 18.

Arranged in the paper transport path 501 are a pickup roller 16A that carries out the paper in the paper supply cassette 16 one by one, a paper supply roller 16B, a separating pad 16C that separates paper such that only the paper in the uppermost position is transported when multiple sheets of paper have been carried out in a stack, and transport rollers 401 and 402, for which the rotational speed at which paper carried out is transported along the paper transport path 501 can be changed.

Immediately after the separating pad 16C of the paper transport path 501, a paper detector 30 is disposed. The paper detector 30 detects the presence or absence of the paper that passes between the paper supply roller 16B and the separating pad 16C. That is, it detects whether or not one sheet of paper has been appropriately carried out from the paper supply cassette 16 to the paper transport path 501 by the pickup roller 16A. Also, the paper detector 30 outputs the detection results to a connected control portion 50 as illustratively shown in FIG. 1.

Arranged in the paper transport path 501 are a register roller 19 that guides the transported paper between the secondary transfer roller 14 and the intermediate transfer belt 11 at a predetermined timing, and a discharge roller 18A that discharges the paper to the discharge tray 18.

Also, a paper transport path 502 is formed in the image forming apparatus 100 in the interval from the manual paper supply tray 17 to the register roller 19. Similar to the configuration of the paper transport path 501, a pickup roller 17A that carries out recording paper placed in the manual paper supply tray 17 one by one into the paper supply path 502, a paper supply roller 17B, and a separating pad 17C are arranged in the paper transport path 502.

Further, a paper transport path 503 is formed in the interval from the discharge roller 18A to the upstream side of the register roller 19 in the paper transport path 501. The discharge roller 18A is made rotatable in both the forward and reverse directions, and is driven in the direction of frontward rotation and discharges the paper to the discharge tray 18 when simplex printing is performed that forms an image on one side of the paper, or when performing image formation for the second face in duplex image formation that forms an image on both sides of the paper.

On the other hand, when performing image formation for the first face in duplex image formation, after being driven in the direction of frontward rotation until the trailing edge of the paper passes the fixing apparatus 15, the discharge roller 18A is driven in the direction of reverse rotation in a state sandwiching the trailing edge of the paper, and guides the paper into the paper transport path 503. Thus, paper on which an image has been formed on only one side when performing duplex image formation is guided to the paper transport path 501 in a state in which the front and back sides and the leading and trailing edges are reversed.

The register roller 19 guides paper that has been supplied from the paper supply cassette 16 or the manual paper supply tray 17, or transported via the paper transport path 503, between the secondary transfer roller 14 and the intermediate transfer belt 11 at a timing synchronous with the rotation of the intermediate transfer belt 11. Thus, the register roller 19 stops rotating at the time that the operation of the photoreceptor drums 101A to 101D and the intermediate transfer belt 11 begins, and paper supplied or transported before rotation of the intermediate transfer belt 11 stops moving in the paper transport path 501 in a state in which the leading edge is caught by the register rollers 19.

Afterwards, the register rollers 19 begin rotation at the timing that the leading edge of the paper and the leading edge of the developer image formed on the intermediate transfer belt 11 face each other at the position where the secondary transfer roller 14 and the intermediate transfer belt 11 press together.

When full color image formation is performed, in which an image is formed in all of the image forming portions 300A to 300D, the first transfer rollers 13A to 13D press the intermediate transfer belt 11 against all of the photoreceptor drums 101A to 101D. On the other hand, when monochrome image formation is performed, in which an image is formed in only the image forming portion 300A, only the first transfer roller 13A presses the intermediate transfer belt 11 against the photoreceptor drum 101A.

Figure 2:
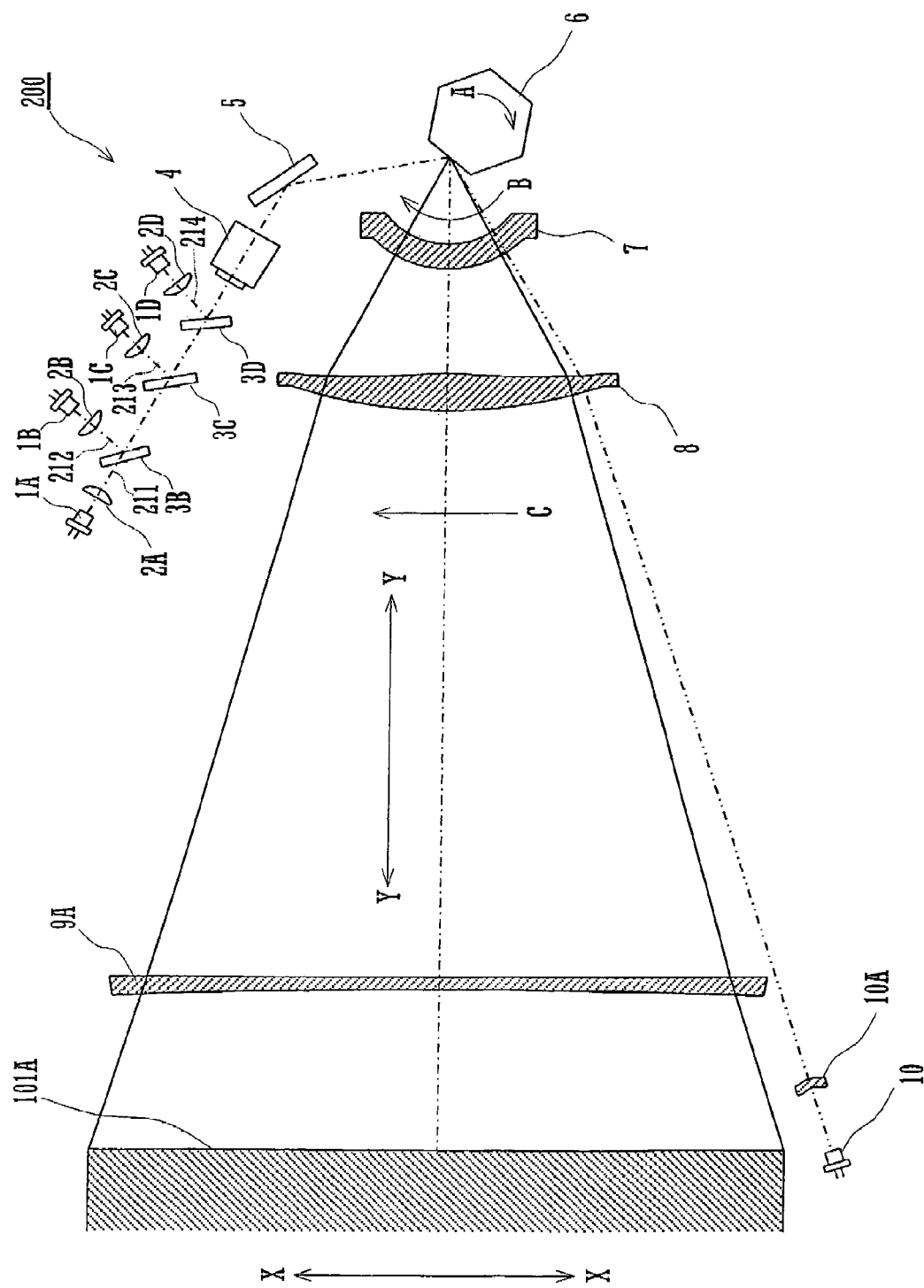
FIG. 2 is a schematic front view that illustratively shows the configuration of the exposing unit 200 that is an optical beam scanning device according to an embodiment of this invention relative to the photoreceptor drum 101A.
Figure 3:
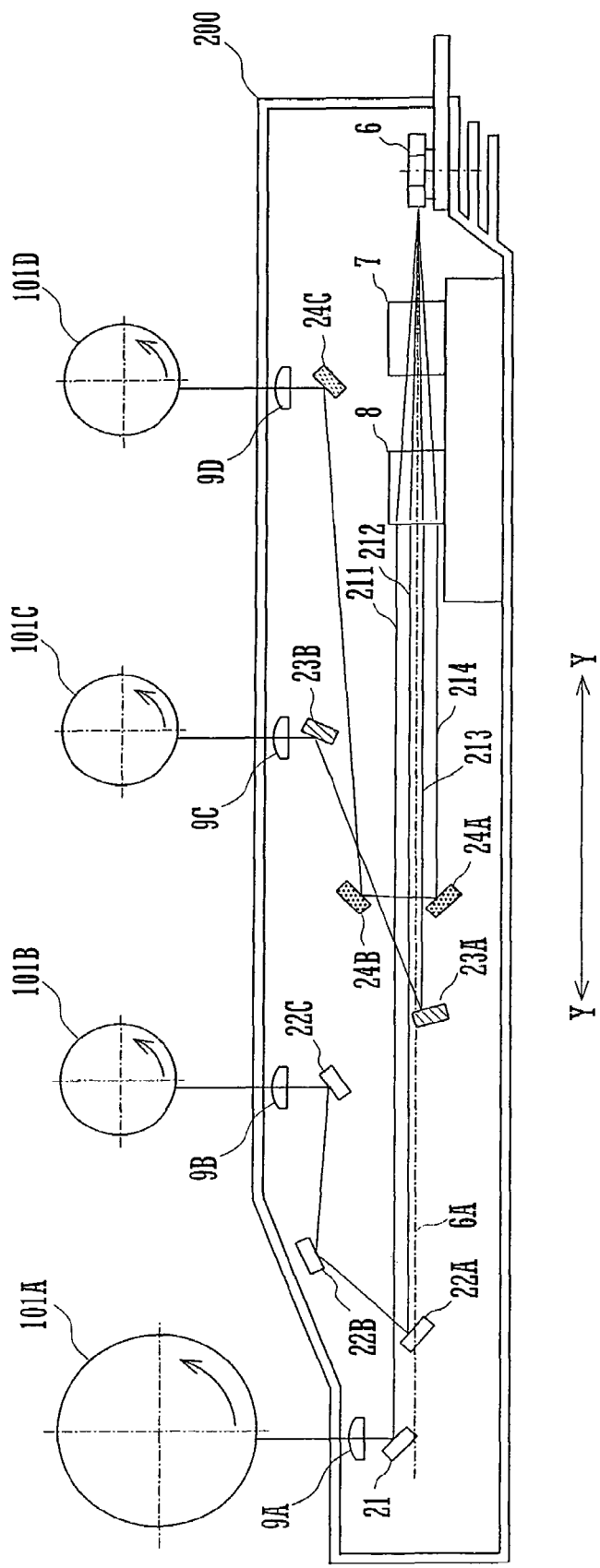
FIG. 3 is a schematic diagram that shows the optical paths of the optical beams in the exposing unit 200.

FIG. 2 is a schematic front view that illustratively shows the configuration of the exposing unit 200 that is an optical beam scanning device according to an embodiment of this invention relative to the photoreceptor drum 101A. FIG. 3 is a schematic diagram that shows the optical paths of the optical beams in the exposing unit 200. The laser beam scanning direction in the direction of the arrow X-X in FIG. 2, which is the direction parallel to the rotational axis of the photoreceptor drum 101 A, is the scanning direction of this invention, referred to below as the main scanning direction. The direction of the arrow Y-Y shown in FIG. 2 and in FIG. 3, which is the direction perpendicular to the main scanning direction inside a main optical axis plane 6A, is referred to as the sub scanning direction.

As shown in FIG. 2 and FIG. 3. the exposing unit 200 is provided with optical parts including laser diodes 1A to 1D, collimator lenses 2A to 2D, mirrors 3B to 3D, a first cylindrical lens 4, a mirror 5, a polygon mirror 6, a first fθ lens 7, a second fθ lens 8, second cylindrical lenses 9A to 9D, mirror 21, mirrors 22A to 22C, mirrors 23A and 23B, mirrors 24A to 24C, a synchronizing lens 10A, and a BD (Beam Detective) sensor 10.

However, for the sake of clarity, FIG. 2 does not show the photoreceptor drums 101B to 101D, the second cylindrical lenses 9A to 9D, and the mirrors 21, 22A to 22C, 23A, 23W and 24A to 24C. Similarly, FIG. 3 does not show the laser diodes 1A to 1D, the collimator lenses 2A to 2D, the mirrors 3B to 3D, the first cylindrical lens 4, the synchronizing lens 10A, and the AD sensor 10 that are depicted more clearly in others of the drawings.

The laser diodes 1A to 1D, which are the light sources of this invention, irradiate laser beams 211 to 214, which are modified based on the image data for black, cyan, magenta, and yellow, respectively. The laser beams 211 to 214 are a plurality of optical beams of this invention. The respective laser beams 211 to 214, which are diffused light irradiated from the laser diodes 1A to 1D, are incident on the reflecting surface of the polygon mirror 6 via the collimator lenses 2A to 2D, the mirrors 3B to 3D, the first cylindrical lens 4, and the mirror 5, at mutually differing angles of incidence in a horizontal plane that includes the rotational axis of the polygon mirror 6.

The polygon mirror 6 is provided with six reflective surfaces, as one example. The polygon mirror 6 rotates in the direction of the arrow A, and deflects the laser beams 211 through 214 at each reflective surface at a constant angular velocity in the direction of the arrow B.

The first fθ lens 7 and the second fθ lens 8 deflect the laser beams 211 to 214, deflected at a constant angular velocity by the polygon mirror 6 in the main scanning direction (the scanning direction of this invention) parallel to the axial direction of the photoreceptor drums 101A to 101D on the surface of the respective photoreceptor drums 101A to 101D, at a constant velocity in the direction of the arrow C. As an example, the first fθ lens 7 is configured with both an incident face and a light exiting face being aspherical surfaces. And, the second fθ lens 8 is configured from an incident face that is made a free-curved surface, and a light exiting face that is made an aspherical surface.

The polygon mirror 6, the first fθ lens 7, and the second fθ lens 8 are the deflecting members of this invention. The mirrors 21 to 24 are the reflecting members of this invention, and separate and reflect the laser beams 211 to 214 such that they are distributed on the surface of the respective photoreceptor drums 101A to 101D. That laser beams 211 to 214 that have passed the second fθ lens 8 each form images on the respective photoreceptor drums 101A to 101D via the mirror 21 and the second cylindrical lens 9A, the mirrors 22A to 22C and the second cylindrical lens 9B, the mirrors 23A and 23B and the second cylindrical lens 9C, and the mirrors 24A to 24C and the second cylindrical lens 9D. The second cylindrical lenses 9A to 9D are the optical members of this invention. In consideration of the ability for mass production, the first fθ lens 7, the second fθ lens 8, and the second cylindrical lenses 9A to 9D use parts made of plastic, but lenses made of glass may also be used.

The BD sensor 10 is the light receiving member of this invention, and detects any of the laser beams 211 to 214 outside of the effective exposing region in the main scanning direction. That is, in a range that any of the laser beams 211 to 214 reflected by a reflective face of the polygon mirror 6 do not reach the surface of the photoreceptor drums 101A to 101D in the main scanning direction, the laser beams 211 to 214 form an image on the light receiving surface of the BD sensor 10 via the synchronous lens 10A. When light has been received from any of the laser beams 211 to 214, a signal is output in order to determine the modulation start timing (the scan timing of this invention) from the image data of the laser beams 211 to 214 of the laser diodes 1A to 1D.

Because the laser beams 211 to 214 are reflected such that all of the laser beams are approximately superimposed at the identical reflecting faces of the polygon mirror 6, it is possible to control the modulation start timing of all of the laser beams with just one laser beam. Because detection is performed by the BD sensor 10 using the laser beam 211 that forms a black image, which has the smallest curve distortion of the scanning line, highly precise detection is possible.

Figure 4:
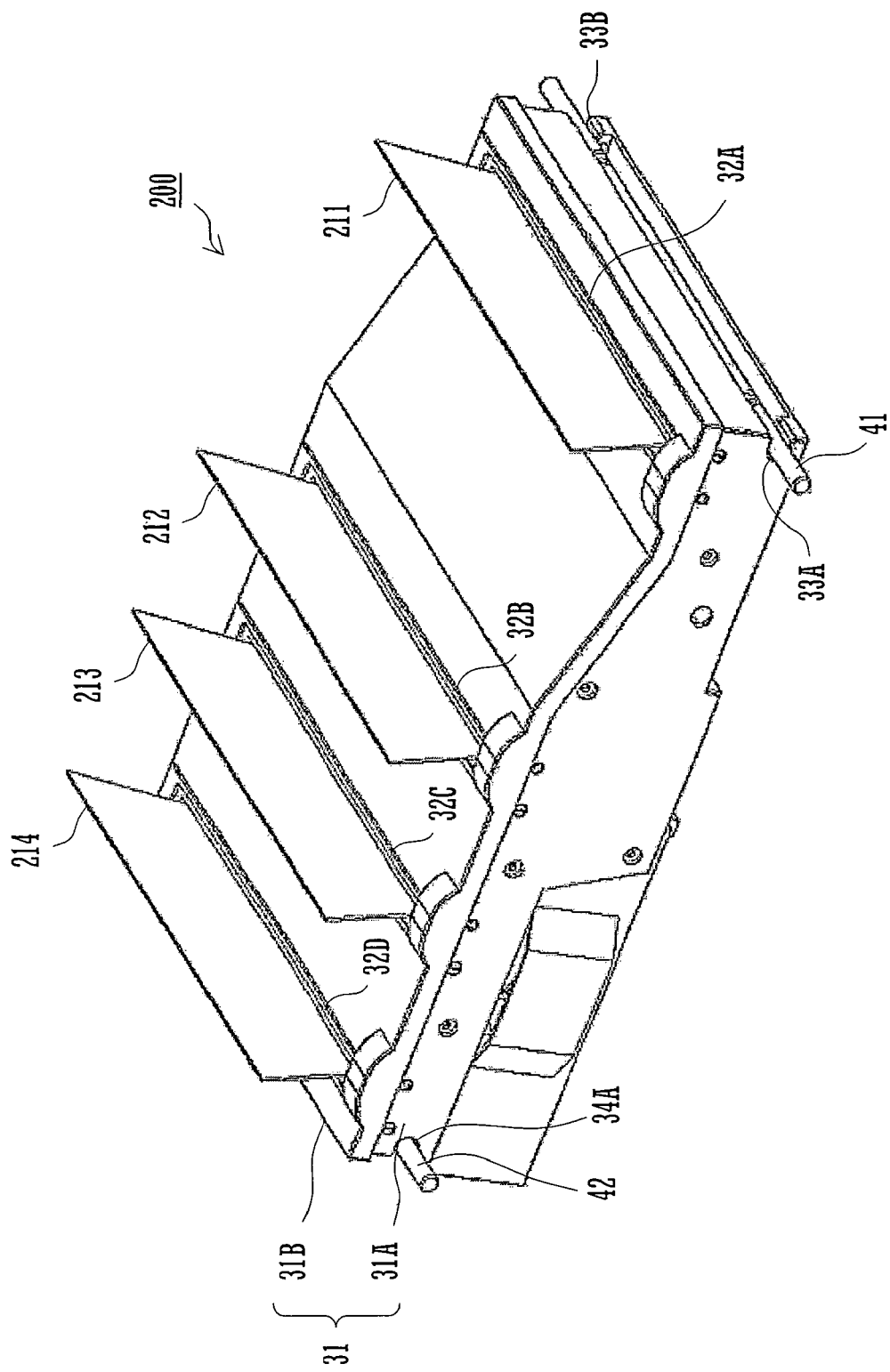
FIG. 4 is an exterior view from diagonally upward of the back side of the exposing unit 200.

FIG. 4 is an exterior view from diagonally upward of the rear side of the exposing unit 200. The exposing unit 200 constitutes an outer surface with a housing 31 that includes a main housing body 31A and a housing lid 31B. As an example, the main housing body 31A and the housing lid 31B are made of inexpensive and lightweight resin that has a comparatively large coefficient of linear expansion, such as a polycarbonate in which glass fiber is mixed (the coefficient of linear expansion for a polycarbonate with a 30% mixture of glass fiber is $2.7 \times 10^{-5}/°C$.).

The reason for using inexpensive and lightweight resin as the material for the housing 31 is that the housing 31 itself does not support other members, and has purposes such as blocking light from the interior of the exposing unit 200 and dust protection.

In the housing lid 31B, slits 32A to 32D are formed in the main scanning direction (the direction of arrow X-X, see FIG. 2) facing the respective photoreceptor drums 101A to 101D (see FIG. 1 and FIG. 3). The laser beams 211 to 214 are irradiated via the slits 32A to 32D toward the photoreceptor drums 101A to 101D.

As will be seen further in FIG. 3. the height of the exposing unit 200, in the portion facing the photoreceptor drum 101A, is less than the portion facing the other photoreceptor drums 101B to 101D. This is because the photoreceptor drum 101A has a large diameter in comparison to the photoreceptor drums 101B to 101D, and it is necessary to make the bottom face of the exposing unit 200 approximately horizontal in order to avoid interference with other units inside of the image forming apparatus 100. When the photoreceptor drums 101A to 101D have the same diameter, the height of the exposing unit 200 can be made approximately uniform across its entire width.

Concave portions 33A, 33B and 34A, that open to the outside in the left and right directions, are formed in at least the front and back sides of the left and right sides of the main housing body 31A (note: the concave portion at the left rear of exposing unit 200-not shown in FIG. 4). The concave portions 33A and 33B and concave portions representatively shown at 34A are respectively fit to axle bodies 41 and 42, the respective ends of which are fixed to the front side frame and back side frame of the image forming apparatus 100 (in a manner not specifically shown). The respective widths of the concave portions in the vertical direction are made larger than the respective outer diameters of the axle bodies 41 and 42.

Also, with respect to the sub scanning direction (the direction of the arrow Y-Y, see FIG. 2 and FIG. 3), the space between the centers of the circular arc portions of the respective concave portions 33A and 33B and the centers of the circular arc portions of the concave portions representatively shown at 34A is made shorter than the distance between the center of the axle body 41 and the center of the axle body 42. Thus, for at least either the concave portions 33A and 33B or the concave portions representatively shown at 34A, only the upper surface thereof contacts the peripheral surface of the one of the axle bodies 41 or 42 disposed therein.

Figure 5:
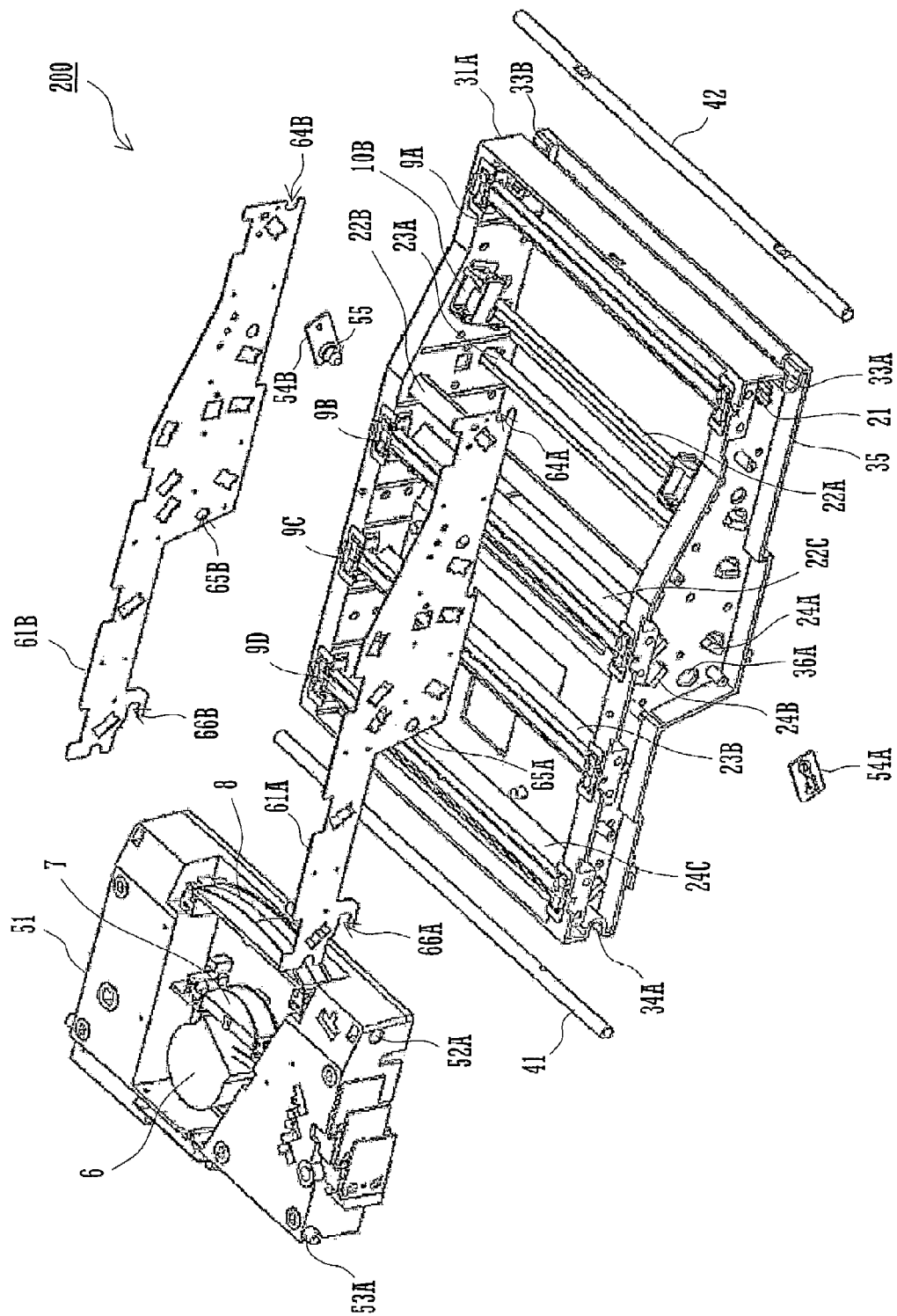
FIG. 5 is an exploded assembly diagram from diagonally upward of the back side that shows the internal structure of the exposing unit 200.

FIG. 5 is an exploded assembly diagram from diagonally upward of the rear side that shows the internal structure of the exposing unit 200. Inside the main housing body 31A are contained the mirror 21, the mirrors 22A to 22C, the mirrors 23A and 23B, the mirrors 24A to 24C, the second cylindrical lenses 9A to 9D, and the BD sensor support 10B, in a state supported by support members 61A and 61B positioned on the front and back sides of the image forming apparatus 100. On one side in the sub scanning direction on the bottom face of the main housing 31A, a deflection unit 51 is disposed that holds the laser diodes 1A to 1D, the collimator lenses 2A to 2D, the mirrors 3B to 3D, the first cylindrical lens 4, and the mirror 5 (shown for example in FIG. 2) accompanied by the polygon mirror 6, the first fθ lens 7, and the second fθ lens 8, in a state supported by the support members 61A and 61B.

The deflection unit 51 is, for example, formed from strong material with a low coefficient of linear expansion such as BMC (the coefficient of linear expansion for BMC is $1.8 \times 10^{-5}/°C$.). In the deflection unit 51, the elements shown in FIG. 2, namely, the laser diodes 1A to 1D, the collimator lenses 2A through 2D, the mirrors 3B to 3D, the first cylindrical lens 4, the mirror 5, the polygon mirror 6, the first fθ lens 7, and the second fθ lens 8 are positioned in a state in which their position relative to each other is strictly regulated.

The front side and back side support members 61A and 61B respectively are formed in a predetermined shape by perforation processing a rolled steel plate with a thickness of 0.8 mm to 1.2 mm. Even with processing for a plate material such as a rolled steel plate, distortion easily occurs due to dimensional tolerance and internal stress in the bending process, it is difficult to properly position each part in the respective support members 61A and 61B, and it is also difficult to make the dimensions between the support member 61A and the support member 61B uniform. On the other hand, with perforation processing that sandwiches the plate material between metal dies, the metal die precision is reflected repeatedly in multiple finished goods, and it is possible to make the dimensions between the support member 61A and the support member 61B uniform.

Figure 6:
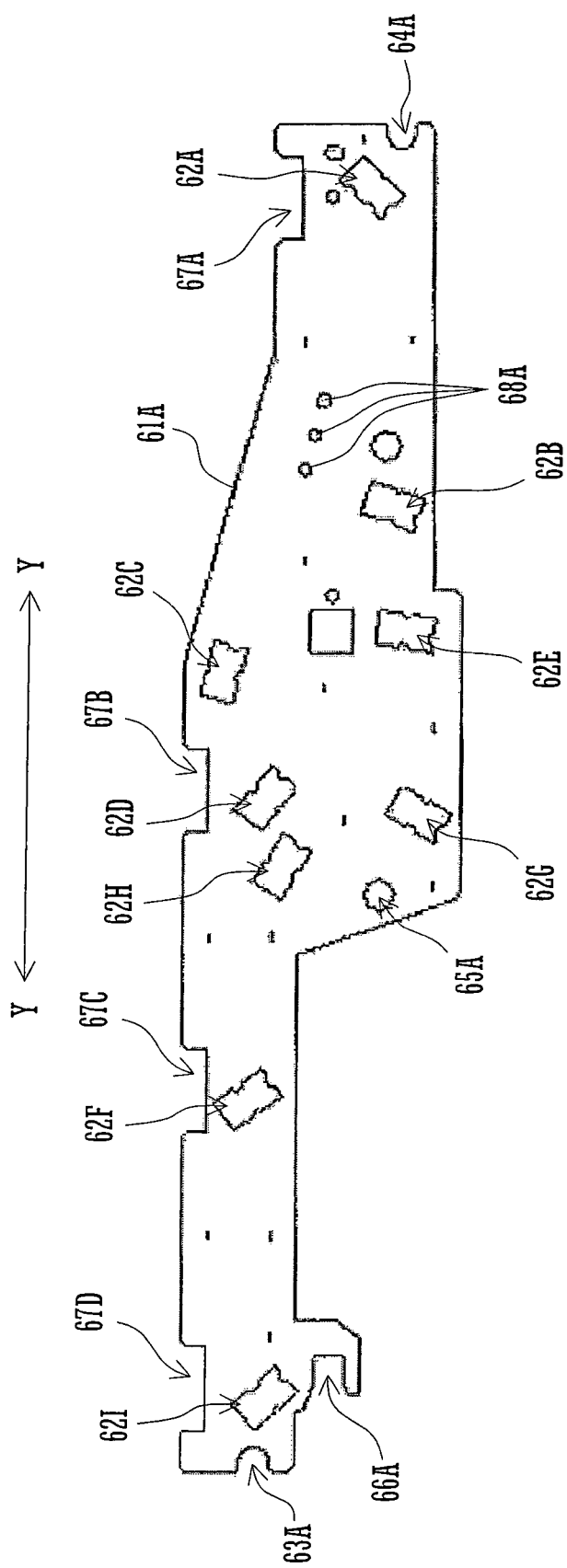
FIG. 6 is a front view of a support member provided in the exposing unit 200.

FIG. 6 is a front view of the support member 61A (that is also representative of a front view of support member 61B) provided in the exposing unit 200. Inside the support member 61A, which is a plate wherein the sub scanning direction (the direction of arrow Y-Y, see FIG. 2 and FIG. 3) is made the lengthwise direction, mirror support portions 62A to 62I each are formed in the shape of a square cavity. The mirror support portions 62A to 62I support respective edges of the mirrors 21, 22A to 22C, 23A, 23B, and 24A to 24C when exposing unit 200 is fully assembled.

Lens support portions 67A to 67D, which are the optical member support portions of this invention, are formed on the upper edge surface of the support member 61A. The lens support portions 67A to 67D each take the form of a rectangular notch, and support the respective edges of the second cylindrical lenses 9A to 9D via an adjusting portion (described below).

A first supported portion 63A and a second supported portion 64A are formed on the left and right edge surfaces of the support member 61A. The supported portion 63A and the supported portion 64A are concave portions that are open to the outside in the sub scanning direction. The supported portions 63A and 64A are respectively fitted to the axle bodies 41 and 42, while the opposite ends of the axle bodies 41 and 42 are fixed respectively to the front and back side frames of the image forming apparatus 100 (in a manner not specifically shown). Thus the support member 61A is supported by the frame of the image forming apparatus 100 via the axle bodies 41 and 42.

The respective widths of the supported portions 63A and 64A in the vertical direction are made larger than the respective outer diameters of the axle bodies 41 and 42. Thus, with respect to the sub scanning direction (the direction of the arrow Y-Y, see FIG. 2 and FIG. 3), the space between the center of the circular arc portion of the supported portion 63A and the center of the circular arc portion of the supported portion 64A is made longer than the distance between the center of the axle body 41 and the center of the axle body 42. Thus only the upper surface of the supported portions 63A and 64A make contact with the respective peripheral surfaces of the axle bodies 41 and 42, and the supported portions 63A and 64A are made displaceable only a predetermined distance in the sub scanning direction relative to the axle bodies 41 and 42.

A fixing cavity 65A is formed in approximately the center portion of the support member 61A in the sub scanning direction. Also, a rectangular concave portion 66A is formed in the lower edge surface of the support member 61A in the neighborhood of the edge in the left side of the figure. The fixing cavity 65A and the concave portion 66A are the first and second unit support portions of this invention. The support member 61A supports the deflecting unit 51 via the fixing cavity 65A and the concave portion 66A (see, FIG. 5).

Also, fixing cavities 68A are formed in the support member 61A. The fixing cavities 68A are the light receiving member support portion of this invention. In each of the fixing cavities 68A a fixing portion 10B that supports a BD sensor 10 and a synchronous lens 10A (see, FIG. 2) is fixed to the support member 61A.

Further, the concave portions 63A and 64A are formed on the left and right edges in the support member 61A.

The support member 61B is configured in the same manner as the support member 61A.

As representatively shown in FIG. 5, installation holes are formed in the front and back surfaces of the deflecting unit 51 in the neighborhood of the edge in the right side of the figure (see representative installation hole 52A. Similarly, support axles are formed in the neighborhood of the edge in the left side of the figure (see representative support axle 53A).

An explanation concerning the front side of the main housing body 31A with reference to FIG. 5 follows.

The support member 61A is housed in the main housing body 31A with the outside wall of the support member 61A contacting the inside surface of the front and back walls of the main housing body 31A, in a state in which the mirrors 21, 22A to 22C, 23A, 23B, and 24A to 24C, the second cylindrical lenses 9A to 9D, and also a BD sensor 10 and the synchronous lens 10A (see FIG. 2) are supported at each support portion 10B in the same manner as similar elements are supported on the rear of the housing body as described hereinabove.

The concave portion 66A is open to the left side in the figure, and its width in the vertical direction is made larger than the outer diameter of the support axle 53A. Also, with respect to the sub scanning direction (the direction of the arrow Y-Y, see FIGS. 2 and 3), the length of the concave portion 66A is made longer than the outer diameter of the support axle 53A. Thus, only the upper surface of the concave portion 66A contacts the peripheral surface of the support axle 53A, and the support axle 53A is made displaceable only a predetermined distance in the sub scanning direction relative to the concave portion 66A.

When the support member 61A is housed in the main body 31A, the concave portion 63A is fitted to the axle body 41 accompanied by the concave portion 34A of the main housing body 31A, and the concave portion 64A is fitted to the axle body 42 accompanied by the concave portion 33A of the main housing body.

A protruding rib 35 (See. FIG. 5) is formed protruding from the front wall of the main housing body 31A along its entire length. Thus, the front wall of the main housing body 31A is made stronger in comparison to other parts. Accordingly, the support member 61A is reinforced by the walls of the main housing body 31A in the main scanning direction, which is the direction of thickness. After housing the support member 61A in the main housing body 31A, the deflecting unit 51 is inserted from the left side in FIG. 5 in the downward direction of the main housing body 31A. When the support member 61A is housed in the main housing body 31A, the fixing cavity 65A of the support member 61A faces the installation cavity 36A of the main housing body 31A. When the support axle 53A of the deflecting unit 51 has been fitted into the concave portion 66A of the support member 61A, the installation hole 52A of the deflection unit 51 faces the fixing cavity 36A of the main housing body 31A and the fixing cavity 65A of the support member 61A.

In this state an axle portion 55 of a fixing portion not shown corresponding to fixing portion 54B on the other side of the main housing body 31A (see FIG. 5) is made to penetrate in sequence from the outside of the main housing body 31A through the fixing cavity 36A and the corresponding one of the fixing cavity 65A, and is fitted in the installation hole 52A. Thus, the support member 61A, the main housing body 31A, and the deflecting unit 51 are positioned at one point in the sub scanning direction. The fixing portion 54B attaches the support member 61B, the main housing body 31A and the deflecting unit 51 in a similar manner.

The axle portion 55 is configured with three portions of mutually varying diameters disposed on the same axle. The axle portion 55 fits with three respective portions of the installation cavity 36A of the main housing body 31A, the fixing cavity 65A of the support member 61A, and the installation hole 52A of the deflection unit 51. Accordingly, the main housing body 31A and the deflecting unit 51 transform independently of each other, and transformation occurring in the main housing body 31A does not affect the position of the deflecting unit 51.

The above description of the support member 61A is else the same for the support member 61B, and the support member 61B is housed in the main housing body 31A in the same manner as the support member 61A. Accordingly. concave portions 63A 64A 66B and a fixing cavity 65B of the support member 61B have the same function as the concave portions 63A, 64A, 66A and the fixing cavity 65A.

Figure 7:
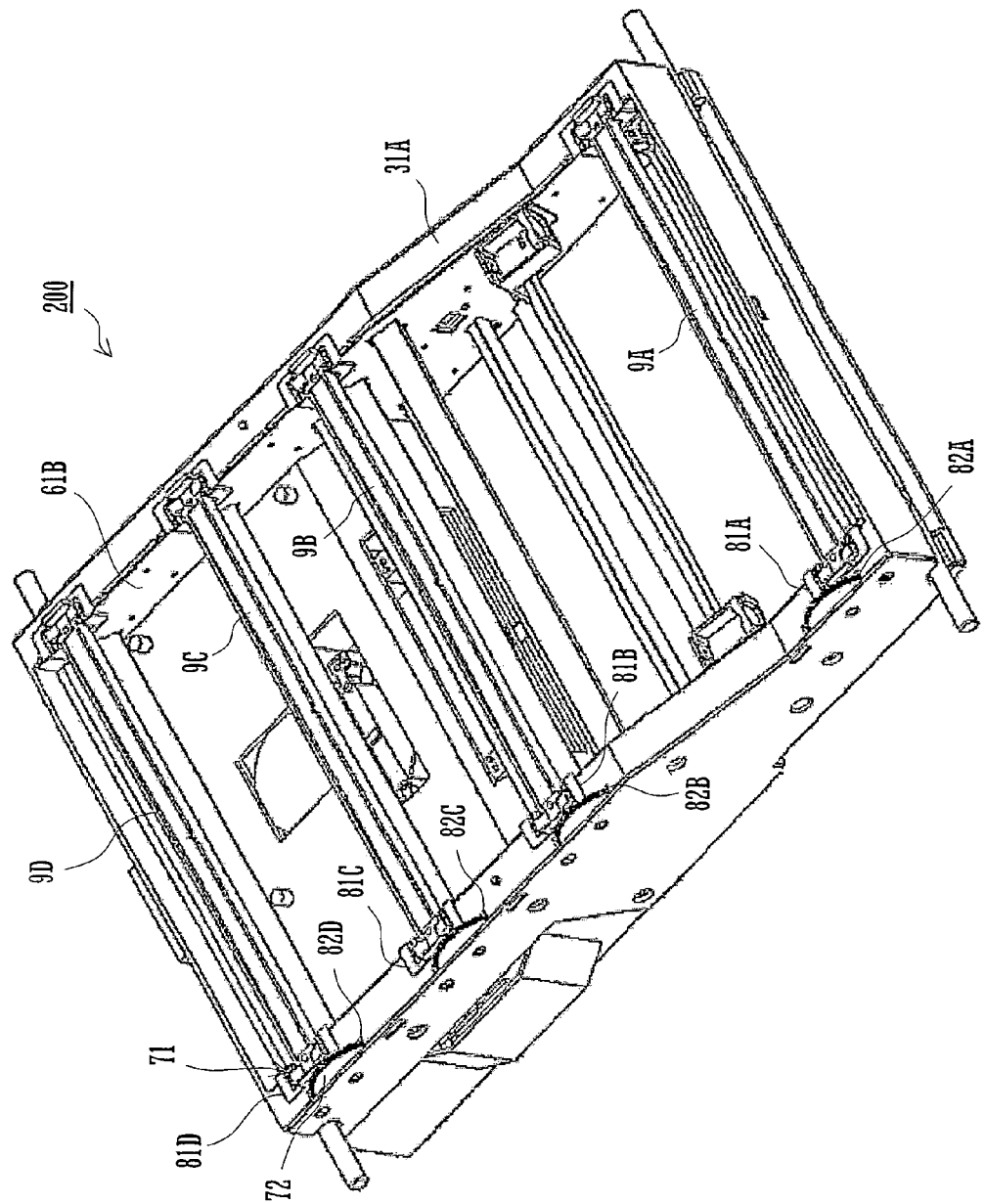
FIG. 7 is a perspective view from diagonally upward of the back side showing the opened state of the exposing unit 200.
Figure 8:
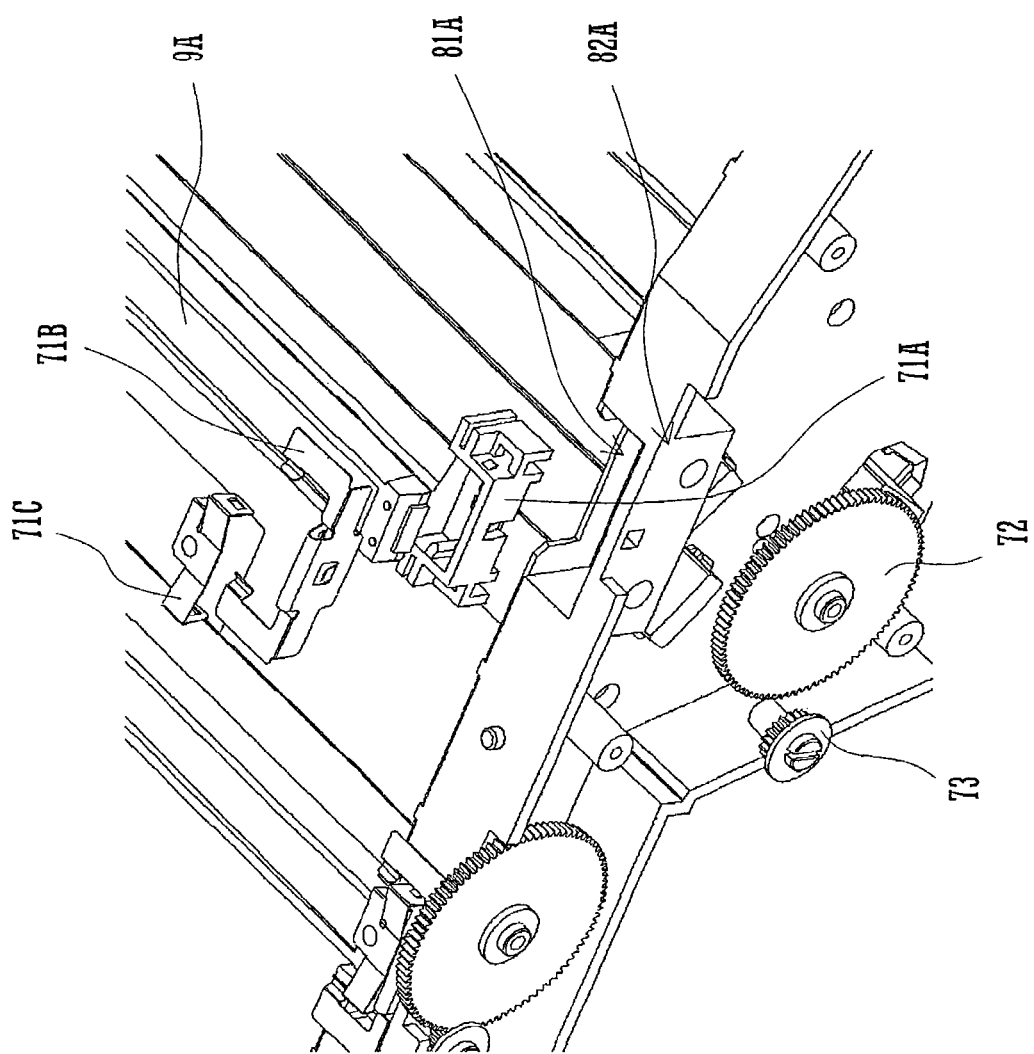
FIG. 8 is a diagram that shows the configuration of the adjusting member used in the exposing unit 200.

FIG. 7 is a perspective view from diagonally upward of the back side showing the opened state of the exposing unit 200. As mentioned above, but not specifically shown in FIG. 7. the support member 61A is fitted to the front side wall of the main housing body 31A in the same manner as the support member 61B is fitted to the rear side wall of the main housing body 31A. FIG. 8 is a diagram that shows the configuration of the adjusting member used in the exposing unit 200. The second cylindrical lenses 9A to 9D are arranged in the uppermost portion inside the optical unit 200 assembled in the manner described above. As stated earlier, the second cylindrical lenses 9A to 9D are supported by the lens support portions 67A to 67D that are formed at the upper edge of the support member 61A by the adjusting portion 71.

FIG. 7 also shows that on the top surface of the front of the main housing body 31A, concave portions 81A to 81D are formed at a position facing the respective lens support portions 67A to 67D of the support member 61A (see, FIG. 6). Also, cavity portions 82A to 82D are formed adjacent to the respective concave portions 81A to 81D. The concave portions 81A to 81D house the adjusting member 71. Part of an adjusting gear, representatively shown at 72, is exposed to the top surface from each of the cavity portions 82A to 82D. The concave portions 81A to 81D that house the adjusting member 71 are similarly formed on the top surface of the back of the main housing body 31A.

As shown in FIG. 8, adjusting member 71 includes a holder 71A, a holder spring 71B, and a lens spring 71C. The edges of the second cylindrical lenses 9A is housed in the holder 71A via the lens spring 71C. The holder 71A is housed in the concave portion 81A of the back of the main housing body 31A via the holder spring 71B. The width of the concave portion 81A is longer than the length of the holder 71A in the sub scanning direction.

The adjusting gear 72 engages with an adjusting gear 73 at the back of the main housing body 31A. Rotation of the adjusting gear 73 is transmitted to the holder 71A housed in the concave portion 81A via a not-show mechanism as linear motion in the sub scanning direction. Thus, by rotating the adjusting gear 72 exposed from the cavity portions 82A, the edge of the back of the second cylindrical lense 9A may be moved in the sub scanning direction, and tilt of the second cylindrical lens 9A in the upper surface of the exposing unit 200 may be changed. Thus, tilt of the image light in the scanning direction relative to the surface of the photoreceptor drum 101A may be adjusted.

In the above manner, the exposing unit 200 according to an embodiment of this invention is configured from a housing 31, a deflecting unit 51, and support members 61A and 61B. The deflecting unit 51, which is made of material that is comparatively heavy and has a small coefficient of linear expansion approaching that of metal, such as BMC, realizes the function of holding the deflecting member and the light source, at strictly regulated positions relative to each other.

Also, the support members 61A and 61B, formed by perforation processing a flat metal plate, realize a function that supports the mirrors 21 to 24C, the second cylindrical lenses 9A to 9D, and the AD sensor 10 and strictly regulates their position relative to each other. Further, while supporting the deflecting unit 51 with its position in the vertical direction surely regulated, the support members 61A and 61B regulate the position at which these parts in the image forming apparatus 100 are disposed and appropriately positions them relative to the photoreceptor drums 101A to 101D.

Further, the housing 31, made from comparatively lightweight resin material such as PPT, realizes a function that prevents the intrusion of dust and the like and the incidence of outside light into the space in which the members are held and supported by the deflecting unit 51 and the support members 61A and 61B by covering the outer portion of the deflecting unit 51 and the support members 61A and 61B, and strengthens the support members 61A and 61B.

Thus, the exposing unit 200 is configured from a plurality of members that each realize different functions, and it is possible to form each portion in a shape appropriate for the function to be realized with materials suitable for the function to be realized by each member.

That is, support members 61A and 61B used for positioning of the optical parts are formed only from the perforation process of a metal plate that has a small coefficient of linear expansion, and by forming the housing 31, which is a large member used for coating the optical parts and reinforcement of the support members 61A and 61B, from comparatively lightweight resin, it is possible to use comparatively heavy materials such as BMC only for the comparatively small deflecting unit 51 used for positioning of the light source and the deflecting member.

For example, when the optical parts are supported in the housing, a decrease in the positional precision of the optical parts due to temperature change should be prevented, and it is necessary to configure the housing, which is a large member, from expensive and heavy material such as BMC, leading to increased cost and weight.

On the other hand, in the exposing unit 200 according to an embodiment of this invention, the housing 31 can be configured from lightweight and inexpensive resin material, and it is possible to realize decreased cost and lighter weight.

Finally, the embodiments described above are to be considered in all respects as illustrative and not limiting. The scope of the invention is indicated by the appended claims rather than by the foregoing embodiments. Furthermore, all changes which come within the meaning and range of equivalency of the claims are intended to be embraced in the scope of the invention.

What is claimed is:

1. An optical beam scanning device comprising:
 a deflecting unit that holds a light source that irradiates an optical beam and a deflecting member that deflects the optical beam irradiated from the light source at a constant velocity after the optical beam is deflected at a constant angular velocity in a predetermined deflection plane, the deflecting unit integrally holding the light source and the deflecting member while maintaining their position relative to each other; and a support member that supports a reflecting member that reflects the optical beam deflected at a constant velocity by the deflecting member toward a scanning target supported by a main apparatus, and also supports the deflecting unit such that the positions of the light source and the deflecting member relative to the reflecting member are preserved, the support member being supported in a predetermined position in the main apparatus, wherein the optical beam scanning device scans the surface of the scanning target in a predetermined scanning direction with the optical beam irradiated from the light source, wherein the support member is a plate disposed respectively on a front side and a back side of the main apparatus, provided with first and second supported portions that are supported by a frame of the main apparatus at two locations in a direction perpendicular to the scanning direction in a plane parallel to the deflection plane, and wherein at least one of the supported portions is supported by the frame of the main apparatus such that the supported portion is movable in the direction perpendicular to the scanning direction in the plane parallel to the deflection plane.

2. The optical beam scanning device according to claim 1, wherein at least one of the supported portions is fitted to an axle body fixed between frames of the front side and the back side of the main apparatus in a direction perpendicular to the scanning direction in the plane parallel to the deflection plane.

3. An optical beam scanning device comprising:

a deflecting unit that holds a light source that irradiates an optical beam and a deflecting member that deflects the optical beam irradiated from the light source at a constant velocity after the optical beam is deflected at a constant angular velocity in a predetermined deflection plane, the deflecting unit integrally holding the light source and the deflecting member while maintaining their position relative to each other; and a support member that supports a reflecting member that reflects the optical beam deflected at a constant velocity by the deflecting member toward a scanning target supported by a main apparatus, and also supports the deflecting unit such that the positions of the light source and the deflecting member relative to the reflecting member are preserved, the support member being supported in a predetermined position in the main apparatus, wherein the optical beam scanning device scans the surface of the scanning target in a predetermined scanning direction with the optical beam irradiated from the light source, wherein the support member is a plate disposed respectively on a front side and a back side of the main apparatus, provided with first and second unit support portions that support the deflecting unit at two locations in a direction perpendicular to the scanning direction in a plane parallel to the deflection plane, and in addition to supporting the deflecting unit at the first unit support portion in a fixed manner, supports the deflecting unit at the second unit support portion such that it can be displaced only in the direction perpendicular to the scanning direction in the plane parallel to the deflecting plane.

4. The optical beam scanning device according to claim 3, wherein at least one of first and second scanning units of the support member is positioned in the deflection plane.

5. The optical beam scanning device according to claim 1, further comprising a wall having an interior face defining a housing that houses the support member and the reflecting member, wherein the support member comprises a first plate and a second plate each having an outer face arranged on the front side and the back side of the main apparatus respectively, and wherein the interior face of the wall defining the housing contacts the outer face of each of the first and second plates thereby fixing the housing to the support member.

6. An optical beam scanning device comprising:

a deflecting unit that holds a light source that irradiates an optical beam and a deflecting member that deflects the optical beam irradiated from the light source at a constant velocity after the optical beam is deflected at a constant angular velocity in a predetermined deflection plane, the deflecting unit integrally holding the light source and the deflecting member while maintaining their position relative to each other; and a support member that supports a reflecting member that reflects the optical beam deflected at a constant velocity by the deflecting member toward a scanning target supported by a main apparatus, and also supports the deflecting unit such that the positions of the light source and the deflecting member relative to the reflecting member are preserved, the support member being supported in a predetermined position in the main apparatus, and a wall having an interior face defining a housing that houses the support member and the reflecting member, wherein the optical beam scanning device scans the surface of the scanning target in a predetermined scanning direction with the optical beam irradiated from the light source, wherein the support member comprises a first plate and a second plate each having an outer surface arranged on a front side and a back side of the main apparatus respectively, and a housing holding portion for fixing the housing at one location in the center portion in the direction perpendicular to the scanning direction in the plane parallel to the deflection plane, and wherein the interior face of the wall of the housing contacts the outer face of each of the first and second plates thereby fixing the housing to the support member.

7. The optical beam scanning device according to claim 5, wherein in the housing, at least strength of the wall surface is greater than strength of other surfaces.

8. The optical beam scanning device according to claim 1, wherein the support member is a plate made of the same material as the frame of the main apparatus.

9. The optical beam scanning device according to claim 1, further comprising a light-receiving member that receives the optical beam at a predetermined position and detects the scanning timing of the optical beam, wherein the support member is a plate and includes a support portion for supporting the light-receiving portion.

10. An optical beam scanning device comprising:

a deflecting unit that holds a light source that irradiates an optical beam and a deflecting member that deflects the optical beam irradiated from the light source at a constant velocity after the optical beam is deflected at a constant angular velocity in a predetermined deflection plane, the deflecting unit integrally holding the light source and the deflecting member while maintaining their position relative to each other; and a support member that supports a reflecting member that reflects the optical beam deflected at a constant velocity by the deflecting member toward a scanning target supported by a main apparatus, and also supports the deflecting unit such that the positions of the light source and the deflecting member relative to the reflecting member are preserved, the support member being supported in a predetermined position in the main apparatus.

wherein the optical beam scanning device scans the surface of the scanning target in a predetermined scanning direction with the optical beam irradiated from the light source, further comprising an optical member that allows the optical beam to provide an image on the surface of the scanning target, wherein the support member is a plate and includes a support portion for supporting the optical member by an adjusting member that adjusts the support position.

11. The optical beam scanning device according to claim 1, further comprising a plurality of the light sources and the reflecting members, wherein a plurality of the scanning targets provided in the main apparatus are each scanned by the plurality of light beams irradiated from the plurality of light sources.

12. The optical beam scanning device according to claim 1, wherein the support member is formed by only perforation processing plate material.

13. The optical beam scanning device according to claim 2, wherein the support member is formed by only perforation processing plate material.

14. The optical beam scanning device according to claim 3, wherein the support member is formed by only perforation processing plate material.

15. The optical beam scanning device according to claim 4, wherein the support member is formed by only perforation processing plate material.

16. The optical beam scanning device according to claim 5, wherein the support member is formed by only perforation processing plate material.

17. The optical beam scanning device according to claim 6, wherein the support member is formed by only perforation processing plate material.

18. The optical beam scanning device according to claim 7, wherein the support member is formed by only perforation processing plate material.

19. The optical beam scanning device according to claim 8, wherein the support member is formed by only perforation processing plate material.

20. The optical beam scanning device according to claim 9, wherein the support member is formed by only perforation processing plate material.

21. The optical beam scanning device according to claim 10, wherein the support member is formed by only perforation processing plate material.

22. The optical beam scanning device according to claim 11, wherein the support member is formed by only perforation processing plate material.

* * * * *